United States Patent [19]

Scribner, Jr.

[11] 4,288,498
[45] Sep. 8, 1981

[54] METHOD OF MAKING LEATHER FIBER INSULATION BY DRYING-CASE HARDENING AND PRODUCT THEREOF

[75] Inventor: Herbert C. Scribner, Jr., Pittsfield, Me.

[73] Assignee: Collagen Corporation, New York, N.Y.

[21] Appl. No.: 147,462

[22] Filed: May 6, 1980

[51] Int. Cl.³ .................... B32B 9/02; B32B 9/04; C14B 1/58
[52] U.S. Cl. ...................... 428/473; 8/150.5; 19/145.5; 19/145.7; 69/21; 156/337; 181/294; 241/23; 241/25; 252/62
[58] Field of Search ............ 241/23, 25; 252/62; 181/294; 428/473; 8/150.5; 19/145.5, 145.7; 69/21

[56] References Cited

U.S. PATENT DOCUMENTS

| 13,171 | 6/1864 | Allen. |
| 20,020 | 4/1868 | Mathieu. |
| 53,095 | 3/1868 | Allen. |
| 73,427 | 1/1868 | Allen. |
| 114,373 | 5/1871 | Waite. |
| 687,131 | 11/1901 | De Long. |
| 743,031 | 11/1908 | Pratt. |
| 1,269,905 | 6/1918 | Clapp. |
| 1,305,770 | 6/1919 | Clapp. |
| 1,541,922 | 6/1925 | Chaney. |
| 1,719,802 | 7/1929 | Ferretti. |
| 2,016,447 | 10/1935 | Katze-Miller. |
| 2,106,896 | 2/1938 | McCulloch et al.. |
| 2,348,807 | 5/1944 | Goodstein. |
| 2,784,132 | 3/1957 | Maisel. |
| 3,292,271 | 12/1966 | Hopkins et al. ............ 8/150.5 |
| 3,532,593 | 10/1970 | Young. |
| 3,537,871 | 11/1970 | Kaneko. |

Primary Examiner—James C. Cannon
Attorney, Agent, or Firm—James & Franklin

[57] ABSTRACT

Chrome tanned leather scrap is converted into thermal insulation by shredding the tanned leather scrap into leather fibers, without damaging the structural fiber integrity, and case hardening the shredded leather fibers. The shredded leather fibers are case hardened by reducing the moisture content thereof to less than 5% by weight, and preferably less than 2%.

14 Claims, 4 Drawing Figures

METHOD OF MAKING LEATHER FIBER INSULATION BY DRYING-CASE HARDENING AND PRODUCT THEREOF

The present invention relates to thermal insulative material, and a method of making the same from shredded leather fibers.

A by-product of conventional chrome leather tanning operations consists of tanned leather scraps (commonly referred to as "blue scrap") comprised of the trimmings, finished trimmings, splits, resplits and shavings. The tanned leather scraps are typically at a moisture level of at least 30% by weight and a pH of about 3.5, the scraps containing fibers having a length of about 0.25–0.75 inches.

Because it is in the nature of leather fibers to have a multitude of hollow, air-filled pockets, it has long been appreciated that thermal insulation can be prepared from leather fibers. However none of the attempts to do so has proved to be entirely satisfactory for a number of reasons. Some attempts involved a working of the scrap leather to such a degree as to break up the air pockets in the leather fibers and thus reduce the insulative value of the material being produced. Others required a wet processing of the scrap leather fiber (typically in paper machines or the like). Others required that the treated leather fibers be used in conjunction with asphalt, pitch or other materials, rather than by itself as an insulation material.

To fully appreciate the difficulties inherent in the prior art processes, it must be recognized that leather scrap, even when reduced in moisture to levels as low as 12% by weight, is naturally hydroscopic and will rapidly pick up moisture from the ambient air until it reaches a moisture content of at least 30% by weight. At this moisture content, the leather fibers are somewhat odoriferous have a reduced insulative value, and tend to cake.

Accordingly, it is an object of the present invention to provide a process for converting tanned leather scrap into insulation material.

Another object is to provide such a process in which the insulation material thus produced has and retains a low moisture content, even in the presence of relatively high humidity.

Yet another object is to provide such a process in which the insulation material is in the form of a batt or pipe wrap.

A further object is to provide such a process in which the insulation material is composed of leather fiber without the addition of asphalt, pitch or similar materials.

It is also an object of the present invention to provide insulation material according to such a process.

SUMMARY OF THE INVENTION

The above related objects of the present invention are obtained in a method of converting tanned leather scrap into thermal insulation comprising the steps of shredding the tanned leather strap into leather fibers without damaging the structural fiber integrity, and case hardening the shredded leather fibers. The shredded leather fibers are case hardened by reducing the moisture content thereof to less than 5% by weight, and preferably less than 2% by weight. The tanned leather scrap is preferably chrome tanned leather scrap.

In a preferred embodiment the shredded leather fibers are treated with a fungicide prior to case hardening and with a base to adjust the pH, as necessary, to 5–8 either before or after case hardening. Prior to shredding, the moisture content of the leather fibers is at least 30% by weight. Prior to case hardening, at least 75% of the shredded leather fiber has a length of 0.25–0.75 inch. The moisture content of the shredded leather fibers is reduced during case hardening by passing the shredded leather fibers through a conveyer blower.

The case hardened shredded leather fibers may be oriented, if desired, to form an insulation batt.

The pipe insulation material of the present invention comprises case-hardened shredded tanned leather fibers. The tanned leather fibers are preferably chrome tanned leather fibers. The case-hardened shredded tanned leather fibers may be oriented to form an insulation batt.

DETAILED DESCRIPTION OF THE PREFERRED EMBODIMENTS

Figure 1:
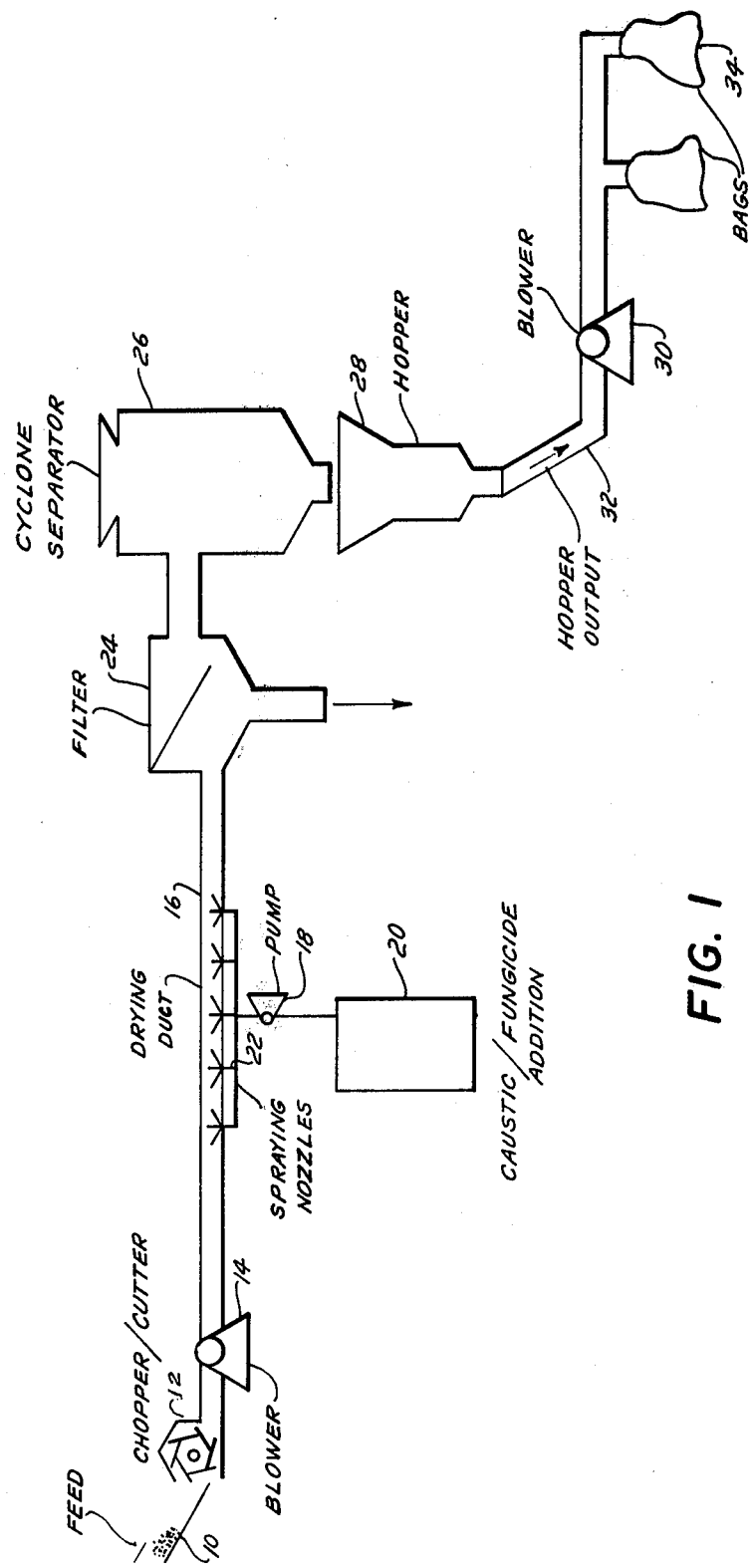
FIG. 1 is a schematic flow chart for the production of loose-fill or blown insulation according to the present invention.

Referring now to the drawing, and in particular to FIG. 1 thereof, chrome tanned leather scraps 10 are fed into a rotary chopper/cutter 12. The tanned leather scraps 10 may include the split, resplit, trimmings, finished trimmings and shavings constituting the typical by-products of the tanning operation. Generally the scraps are at a pH of about 3.5 as a result of the tanning operation, and contain fibers ranging in length from 0.25–0.75 inch, although smaller fibers may also be found therein. Generally the scraps will be extremely moist to the touch, having a moisture content in excess of 30% by weight. Indeed, a moisture content of 30–50% is desirable to facilitate operation of the rotary chopper/cutter 12 and the scraps may be intentionally moisturized, if desired, to facilitate such operation.

The rotary chopper/cutter 12 includes two sets of inter-engaging dull knives, the knife-to-knife spacing typically being set for about one-eighth of an inch. The tanned leather scraps are fed through a single cycle of the chopper/cutter, this usually being effective to reduce about 75% of the longer fibers (that is, those at the 0.75 inch end of the spectrum) into smaller lengths (typically 0.25–0.75 inch), without further reducing the length of the fibers at the lower end of the spectrum. The dull knives of the chopper/cutter 12 have the effect of tearing the tanned leather scraps into discrete fibers without damaging the structural fiber integrity of the leather fibers except for the aforenoted reduction of length. Care should be taken in this stage of the operation to limit the dwell time of the fibers in the chopper/cutter as excessive shredding might adversely affect the structural fiber integrity necessary for high insulative value. The MR/MRP Cutter Serial 61-1144 manufactured by Sprout, Waldron & Co., Inc. (Muncy, Pa.) is satisfactory for this purpose.

As the shredded leather fibers exit from the chopper/cutter 12, they enter into a high speed conveyer blower 14 which employs warm air to blow the fibers along the length of a drying duct 16. The hot air transporting the fibers also dries the fibers, it being essential that the blower 14 be effective to reduce the moisture content of the shredded leather fibers to less than 5% by weight, and preferably less than 2%. Once the moisture content has been reduced to this level, the shredded leather fibers become case hardened—that is, the outer surface of the leather fiber loses its hydroscopic tendency and indeed precludes any substantial water absorption by the fiber. Even in the presence of 100% humidity, the case hardened fibers take up moisture only to a level of about 12% over an eight hour period. (By way of contrast, fibers which have been dried to a 12% moisture level, but not case hardened, will pick up moisture and may develop a moisture content of 35% in as little as eight hours.)

The conveyer blower 14 may include means for impregnating the leather fibers, prior to case hardening thereof, with a fungicide such as Amical 48 (from Abbott Laboratories, distributed by Chemtan Corp., Inc. of Exeter, N.H.) or p-nitrophenol to prevent subsequent mold formation.

The conveyer blower 14 may further include means to inject a base (such as caustic sode) into the leather fibers in a quantity sufficient to overcome the acidity of the leather fibers as received from the tanning plant and develop therein a pH of about 5-8. The pH adjustment may be performed either before or after the case hardening of the leather fibers.

Alternatively, the fungicide and caustic additions may be performed downstream from the conveyer blower 14, provided that the fungicide addition occurs before case hardening of the fibers. In a preferred embodiment, and as illustrated in FIG. 1, the caustic and fungicide may be added simultaneously, the caustic/fungicide addition being delivered by a pump 18 from a common container 20 to a series of spray nozzles 22 adapted to spray the caustic/fungicide addition onto the fibers prior to case hardening thereof.

The conveyer blower 14 may also include a filter through which the leather fibers are forced to remove any dust, grease, fleshings, and dried lumps from the scrap leather. Aternatively, and as illustrated in FIG. 1, a filter 24 may be disposed downstream of the conveyer blower 14 and, preferably, adjacent the opposite end of the drying duct 16. The reject fleshings discharged from the bottom of the filter 24 may be collected and disposed of in customary fashion.

At the end of the drying duct 16, the case hardened leather fibers pass through a cylcone separator where the excess air and moisture is removed from the drying duct effluent and the case hardened leather fibers permitted to drop through a hopper 28. A conveyer blower 30 draws the case hardened leather fibers through the hopper output 32 and into bags 34, the filled bags 34 then being available for use as loose-fill insulation material. If desired, the output from blower 30 can be collected in larger containers, the output later being removed from the containers for use as blown insulation.

Figure 2:
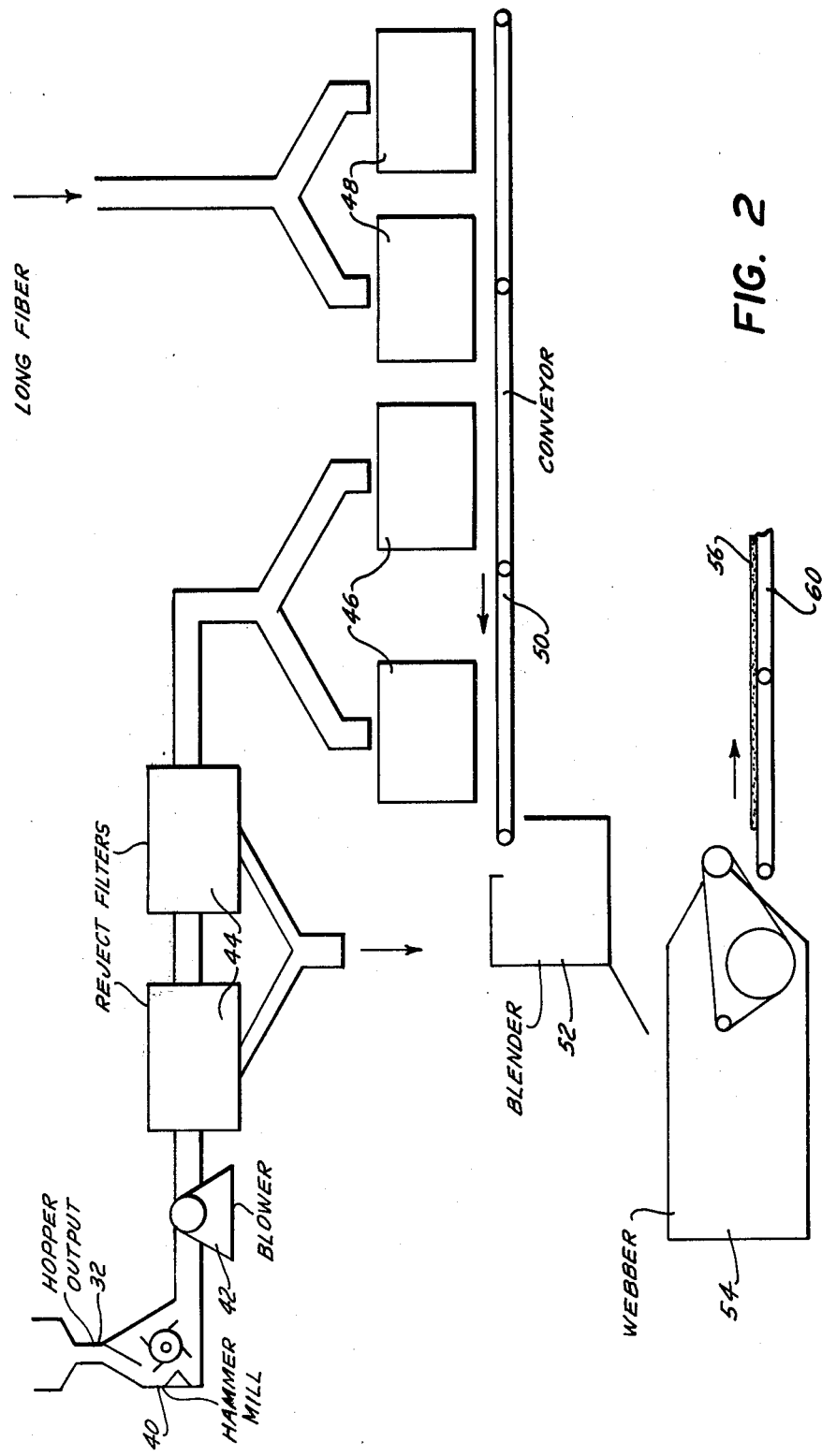
FIGS. 2 and 3 together are a partial schematic flow chart for the production of batt insulation according to the present invention.

While the above operations are sufficient for the production of loose-fill or blown insulation, the production of pipe wrap or batt insulation requires further processing. Referring now to FIG. 2, if a batt is desired, the case hardened leather fibers emitted from hopper output 32 are passed through a hammer mill 40 which shreds the fibers, thereby completing separation of the leather fibers and rendering them a relatively uniform 0.25-0.37inch in length. A suitable hammer mill for this purpose is the CG-2 hammer mill manufactured by Sprout, Waldron & Co., of Munsey, Pa. Under the influence of high speed blower 42 the output from hammer will 40 is passed through a pair of reject filters 44 to remove oversized and undersized fibers, the undersized fibers or "dust" being collected in bags (not shown) at the base of the filters for disposal.

The shredded leather fiber from the hammer mill is preferably blended with carded discrete long fibers. While the added long fibers may be any natural or synthetic fibers, polyester fibers are preferred. These added long fibers generally have a length of about 1-1.25 inches. Longer fibers (even about two inches in length) may be used, although such fibers tend to be more expensive than shorter ones. Generally about 15% of the long fibers are added, based on the combined fiber weight. Greater percentages of the added long fibers may be used, although without appreciable advantage in view of the higher cost thereof. Accordingly, the case hardened leather fibers passing through reject filters 44 may be stored in bins 46 while the long fibers to be added thereto are stored in bins 48. Bins 46, 48 are periodically discharged, in appropriate proportions, onto a conveyer 50 passing thereunder, the conveyer 50 transporting the short fibers from bins 46 and the long fibers from bins 48 into a blender 52 (for example, a screw blender), where the long and short fibers are thoroughly blended.

The output from the blender 52 is then passed into a conventional webber or batt maker 54 (for example, a Rando webber available from the Rando Machine Corp. located at The Commons, Macedon, N. Y. 14502) to produce a web or batt 56 of uniform thickness, preferably about 0.25-1.5 inches thickness.

Figure 3:
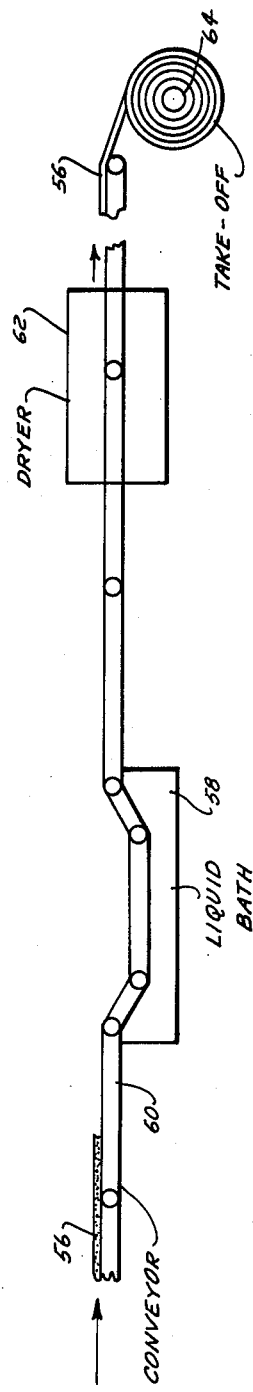

Referring now to FIG. 3, the batt 56 is preferably passed from the batt maker 54 through liquid bath 58 to orient the batt fibers in parallel fashion for uniformity and enhanced strength. The passage of the batt 56 through the liquid bath 58 also has a tendency to further reduce the thickness thereof, generally to about 0.25 inch. A transfer conveyer, screen or other supporting device 60 may be required to maintain the structural integrity of the batt as it passes through the fluid bath. Naturally the liquid bath 58 can include fire retardants, fungicides, coloring agents and other additives to be determined by the ultimate application of the batt.

Figure 4:
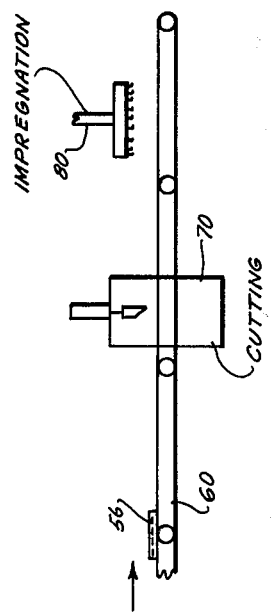
FIG. 4 is a partial schematic flow chart for the production of sheet building material according to the present invention.

Referring now to FIG. 4 in particular, the batt 56 emerging from the dryer 62 may be transformed into building material or sheeting composed of several plies of the batt, preferably impregnated with a tar-like substance, e.g., asphalt. To this end the batt 56 is carried by conveyer 60 through a cutting station 70 where the batt 56 is cut into suitable lengths for its intended purpose, and an impregnation station 80 where the cut batt is impregnated with a solvent-carried tar-like material (such as asphalt) for enhanced strength. A stack of the cut and preferably impregnated batts 56 is then passed through a compression station 82 where a pair of hot compression rolls drive off the solvent and compress the stack into suitable building material sheet, ready for shipment. If the sheet is to be composed of unimpregnated batts 56, the batt 56 is simply passed through the cutting station 70 and then two or three cut batts 56 are stacked on top of each other to form the sheet.

The loose-fill insulation material of the present invention is characterized by a thermal resistance intermediate that of fiberglass and styrofoam. It is an effective sound absorption material, and doesn't burn (but merely smolders when ignited). As tested by ASTM C739, "Specification for Cellulosic Fiber (Wood-Base) Loose-Fill Thermal Insulation," the loose-fill product of the present invention has the distinct odor of leather, but is not considered offensive, and has a moisture absorption of only 10.5%. As determined by ASTM C177, "Thermal Conductivity of Materials by Means of the Guarded Hot Plate," the loose fill material of the present invention has (at 20° Celsius and 2.5 lbs/ft$^3$ density at 4 inches thickness) a thermal resistance of 4.0 hr-ft$^2$-°F./BTU (on a dry basis) and an apparent thermal conductivity of 0.25 BTU-in/hr-ft$^2$-° F. or 0.036 Watts/m-° K.

A theoretical explanation of the case hardening phenomenon is present below, but it will be appreciated that the efficacy of the present invention is not dependent upon any theoretical explanation. Leather (i.e., collagen) is a hollow fiber and as such has the ability to hold water (a) internally bound within the hollow of the fiber, (b) mechanically bound between two adjacent fibers, and (c) ionically bound due to electrostatic sites on the fiber. Since many of the available ionic attraction sites are occupied by the salts and other chemicals used in the chrome tanning process, the bulk of the water held in a chrome tanned material is due to the presence of internally or mechanically bound water. The shredding of the fibers in the chopper/cutter, as described above, exposes many of the hollows within the fiber and thus increases the surface area exposed for drying of the internally bound water. The passage of the shredded leather fibers through a drying duct under the influence of a conveyor blower, as described above, then suffices to dry off the moisture mechanically held between adjacent fibers and enables the overall moisture content to be reduced to less than 5% by weight, and preferably less than 2% by weight. This is apparently effective to produce case hardening, as indicated by the fact that once the moisture content has been reduced to this level, the maximum molecular uptake of water is less than 12%.

To summarize, the present invention provides a process for converting tanned leather scrap into loose fill or blown insulation, pipe wrap or batt insulation, or building material sheet insulation. The insulation is non-odoriferous and of high insulative value.

Now that the preferred embodiments of the present invention have been shown and described in detail, various modifications and improvements thereon will become readily apparent to those skilled in the art. Accordingly, the spirit and scope of the present invention is to be limited only by the appended claims, and not by the foregoing disclosure.

I claim:

1. Pipe insulation material comprising case-hardened shredded tanned leather fibers of reduced hydroscopic tendency capable of taking up moisture only to a level of about 12% by weight or less over an eight hour period in an atmosphere of 100% humidity.

2. The material of claim 1, wherein said tanned leather fibers are chrome tanned leather fibers.

3. The material of claim 1, wherein said case-hardened shredded tanned leather fibers are oriented to form an insulation batt.

4. A method of converting tanned leather scrap into thermal insulation comprising the steps of:
   (A) Shredding the tanned leather scrap into leather fibers without damaging the structural fiber integrity; and
   (B) case hardening the shredded leather fibers by drying same to produce fibers of reduced hydroscopic tendency capable of taking up moisture only to a level of about 12% by weight or less over an eight hour period in an atmosphere of 100% humidity.

5. The method of claim 4 wherein in step (B) said shredded leather fibers are case hardened by reducing the moisture content thereof to less than 5% by weight.

6. The method of claim 5 wherein in step (B) said shredded leather fibers are case hardened by reducing the moisture content thereof to less than 2% by weight.

7. The method of claims 4, 5 or 6 wherein said tanned leather scrap is chrome tanned leather scrap.

8. The method of claim 4 wherein prior to step (B) said shredded leather fibers are treated with a fungicide.

9. The method of claim 4 wherein the pH of said shredded leather fibers is adjusted, as necessary, to a pH of 5–8 by the addition of a base.

10. The method of claim 9 wherein the pH is adjusted after step (B).

11. The method of claim 4, wherein prior to step (A) the moisture content of said leather fibers is at least 30% by weight.

12. The method of claim 10 wherein the moisture content of said shredded leather fibers is reduced in step (B) by passing said shredded leather fibers through a conveyor blower.

13. The method of claim 4 wherein prior to step (B) at least 75% of said shredder leather fiber has a length of 0.25–0.75 inch.

14. The method of claim 4 wherein subsequent to step (B) said shredded leather fibers are oriented to form an insulation batt.

* * * * *